(12) United States Patent
Haartsen et al.

(10) Patent No.: US 8,040,219 B2
(45) Date of Patent: Oct. 18, 2011

(54) SYSTEM AND METHOD FOR IN-BUILDING LOCATION DETERMINATION

(75) Inventors: Jacobus Haartsen, Hardenberg (NL); William O. Camp, Jr., Chapel Hill, NC (US); Bjorn Lindquist, Bjärred (SE)

(73) Assignee: Sony Ericsson Mobile Communications AB, Lund (SE)

( * ) Notice: Subject to any disclaimer, the term of this patent is extended or adjusted under 35 U.S.C. 154(b) by 349 days.

(21) Appl. No.: 12/265,921

(22) Filed: Nov. 6, 2008

(65) Prior Publication Data

US 2010/0109864 A1 May 6, 2010

(51) Int. Cl.
*G01S 1/02* (2010.01)
(52) U.S. Cl. .......... 340/8.1; 340/539.11; 340/539.13; 340/539.23; 455/404.2; 455/41.2; 455/456.1; 455/456.5; 455/456.6; 342/464
(58) Field of Classification Search ........ 455/456.1–457, 455/404.2, 41.2; 340/539.11, 539.13, 539.23, 340/825.49, 8.1; 342/464, 463
See application file for complete search history.

(56) References Cited

U.S. PATENT DOCUMENTS

| | | | |
|---|---|---|---|
| 5,670,964 A | 9/1997 | Dent | |
| 7,149,499 B1 | 12/2006 | Oran et al. | |
| 7,383,052 B2 * | 6/2008 | Moton et al. | 455/456.2 |
| 7,751,829 B2 * | 7/2010 | Masuoka et al. | 455/456.1 |
| 2002/0072369 A1 * | 6/2002 | Sasada et al. | 455/435 |
| 2003/0125045 A1 | 7/2003 | Riley et al. | |
| 2004/0003098 A1 | 1/2004 | Coffy et al. | |
| 2005/0073979 A1 * | 4/2005 | Barber et al. | 370/338 |
| 2005/0094610 A1 | 5/2005 | de Clerq et al. | |
| 2006/0025132 A1 | 2/2006 | Karaoguz et al. | |
| 2007/0067434 A1 * | 3/2007 | Bahl | 709/223 |
| 2007/0257831 A1 * | 11/2007 | Mathews et al. | 342/22 |
| 2008/0137594 A1 * | 6/2008 | Roh et al. | 370/328 |
| 2008/0280624 A1 * | 11/2008 | Wrappe | 455/456.1 |
| 2009/0138353 A1 * | 5/2009 | Mendelson | 705/14 |

FOREIGN PATENT DOCUMENTS

| | | |
|---|---|---|
| EP | 1841256 | 10/2007 |
| WO | 9738548 | 10/1997 |
| WO | 03092318 | 11/2003 |
| WO | 2005106523 | 11/2005 |
| WO | 2006068371 | 6/2006 |

OTHER PUBLICATIONS

C. Di Flora et al., "Indoor and Outdoor Location Based Services for Portable Wireless Devices", Distributed Computing Systems Workshops, Jun. 2005, pp. 244-250.
International Search Report and Written Opinion from corresponding International Application No. PCT/IB09/5490.

* cited by examiner

*Primary Examiner* — George Bugg
*Assistant Examiner* — Anne Lai
(74) *Attorney, Agent, or Firm* — Renner, Otto, Boisselle & Sklar, LLP (57) ABSTRACT

To enhance in-building location determination of an electronic device, described is a system and a method that uses a blip access point to transfer location assistance information to the electronic device. The location assistance information may contain a map of dummy beacons that serve as reference points (e.g., landmarks) from which the electronic device may determine its location relative to the map information.

20 Claims, 2 Drawing Sheets

SYSTEM AND METHOD FOR IN-BUILDING LOCATION DETERMINATION

TECHNICAL FIELD OF THE INVENTION

The technology of the present disclosure relates generally to portable electronic devices and, more particularly, to a system and method for determining a location of a portable electronic device when the portable electronic device is located within a building.

BACKGROUND

The location of a portable electronic device may be determined using a global positioning system (GPS). As is known, a GPS-capable device determines its terrestrial location by triangulating its position relative to GPS satellites in orbit around the earth. This process includes receiving signals transmitted from the satellites, measuring the travel times of the signals from the satellites to the receiver, and then calculating the distances of the satellites from the receiver based on the travel time to derive a location value. The location value may be coordinates expressed using a standard reference system, such as the world geodetic system (WGS).

In another approach, assisted-GPS (or A-GPS) may be used to determine the location of the electronic device. A-GPS uses an assistance server to process location related data and access a reference network to speed location determination and to transfer processing tasks from the electronic device to the server. For instance, the assistance server may perform tasks to make range measurements and calculate position solutions that would otherwise be carried out by the electronic device.

Another location determining approach that is used in cellular telephone networks is to determine the identities of communications access points (e.g., "cell towers") that are within communication range of the electronic device. Each cell tower may have an identifier (e.g., "cell ID") and the identifier is communicated to the electronic device or a server. Each identifier, or cell ID, in a particular servicing network may be assumed to be unique and, therefore, may be used to indicate relative proximity to a certain location. In one embodiment, the cell ID and any related radio parameters may be used to generate a coordinate value through a radio network service. For example, under global system mobile communications (GSM) and universal mobile telecommunications system (UMTS) protocols, the position could be estimated through a mobile originated location request (MO-LR) to the network so that the electronic device position could be estimated using the network's knowledge of tower locations and antenna directions.

While GPS receivers are generally very accurate in determining position, they can become unreliable in indoor environments and, therefore, are not desirable for identifying a location of an electronic device within an indoor location, such as a home, office building, factory, etc. In addition, basing location on cell tower information is generally not accurate enough to distinguish relatively small differences in location that may occur when moving within a building.

The Bluetooth Special Interest Group (SIG) has proposed a technique for determining in-building location. In this proposal, a network of Bluetooth stations is deployed and the electronic device ranges on the stations as if the network were a miniature GPS system. However, this involves coordination among the stations, achieves an unnecessarily high degree of accuracy, and requires the electronic device to carry out steps that are not present in standard Bluetooth application specific integrated circuits (ASICs).

SUMMARY

To enhance in-building location determination, the present disclosure describes a system and a method that uses a blip access point to transfer location assistance information to an electronic device. The location assistance information may contain a map of dummy beacons that serve as reference points (e.g., landmarks) from which the electronic device may determine its location relative to the map information.

According to one aspect of the disclosure, a method of determining a location of an electronic device when the electronic device is in a building includes receiving location assistance information from a data source, wherein the location assistance information contains a position and a beacon identity for each of plural location beacons that are deployed in the building; listening for one or more beacon identities from the location beacons; and determining an area of the building in which the electronic device is located, the area determined from a distance parameter associated with each received beacon identity, each distance parameter indicating a relative distance between the electronic device and the position of the corresponding location beacon.

According to one embodiment of the method, the location assistance information is received from a wireless access point when the electronic device enters the building.

According to one embodiment of the method, the wireless access point also functions as one of the location beacons.

According to one embodiment of the method, the data source is a blip access point.

According to one embodiment of the method, the data source broadcasts the location assistance information using Bluetooth.

According to one embodiment of the method, the location beacons broadcast using a one-directional broadcast protocol.

According to one embodiment of the method, the location beacons are not interconnected with a network infrastructure.

According to one embodiment, the method further includes correlating the determined area to a position value using the location assistance information, the position value approximating the location of the electronic device.

According to one embodiment, the method further includes determining a signal strength for each received beacon identity, and using the signal strengths to determine the distance parameter.

According to one embodiment of the method, the location assistance information contains signal strength contours for each location beacon, and the signal strengths for each received beacon identity are compared to the corresponding signal strength contours to determine a distance range between the electronic device and the corresponding location beacon.

According to one embodiment of the method, the electronic device uses Chase combining to extend a listening range of the electronic device for the beacon identities.

According to one embodiment, the method further includes collecting data for use in calculating the area of the building in which the electronic device is located as the electronic device moves within the building and transmitting the collected information to a system for use in making future location determinations of the electronic device or other electronic devices.

According to another aspect of the disclosure, an electronic device includes a radio circuit over which location assistance information from a data source is received, wherein the location assistance information contains a position and a beacon identity for each of plural location beacons that are deployed in a building; and a control circuit that controls the electronic device to listen for one or more beacon identities from the location beacons and determine an area of the building in which the electronic device is located, the area determined from a distance parameter associated with each received beacon identity, each distance parameter indicating a relative distance between the electronic device and the position of the corresponding location beacon.

According to yet another aspect of the disclosure, a location assistance system for aiding an electronic device to determine a location of the electronic device while in a building in which the location assistance system is deployed includes a plurality of location beacons that each broadcast a beacon identity; and a wireless access point that transmits location assistance information, wherein the location assistance information contains a position and the beacon identity for each of the plural location beacons.

According to one embodiment of the system, the wireless access point is located at an entrance to the building to broadcast the location assistance information to the electronic device when the electronic device enters the building.

According to one embodiment of the system, the wireless access point also functions as one of the location beacons.

According to one embodiment of the system, the wireless access point is a blip access point.

According to one embodiment of the system, the location beacons broadcast using a one-directional broadcast protocol.

According to one embodiment of the system, the location beacons are not interconnected with a network infrastructure.

According to one embodiment of the system, the location assistance information contains signal strength contours for each location beacon.

According to one embodiment of the system, the beacon identities are broadcast by each location beacon as a repeating sequence.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Embodiments will now be described with reference to the drawings, wherein like reference numerals are used to refer to like elements throughout. It will be understood that the figures are not necessarily to scale.

In the present document, embodiments are described primarily in the context of a portable radio communications device, such as the illustrated mobile telephone. It will be appreciated, however, that the exemplary context of a mobile telephone is not the only operational environment in which aspects of the disclosed systems and methods may be used. Therefore, the techniques described in this document may be applied to any type of appropriate electronic device, examples of which include a mobile telephone, a media player, a gaming device, a computer, a pager, a communicator, an electronic organizer, a personal digital assistant (PDA), a smartphone, a portable communication apparatus, etc.

Figure 1:
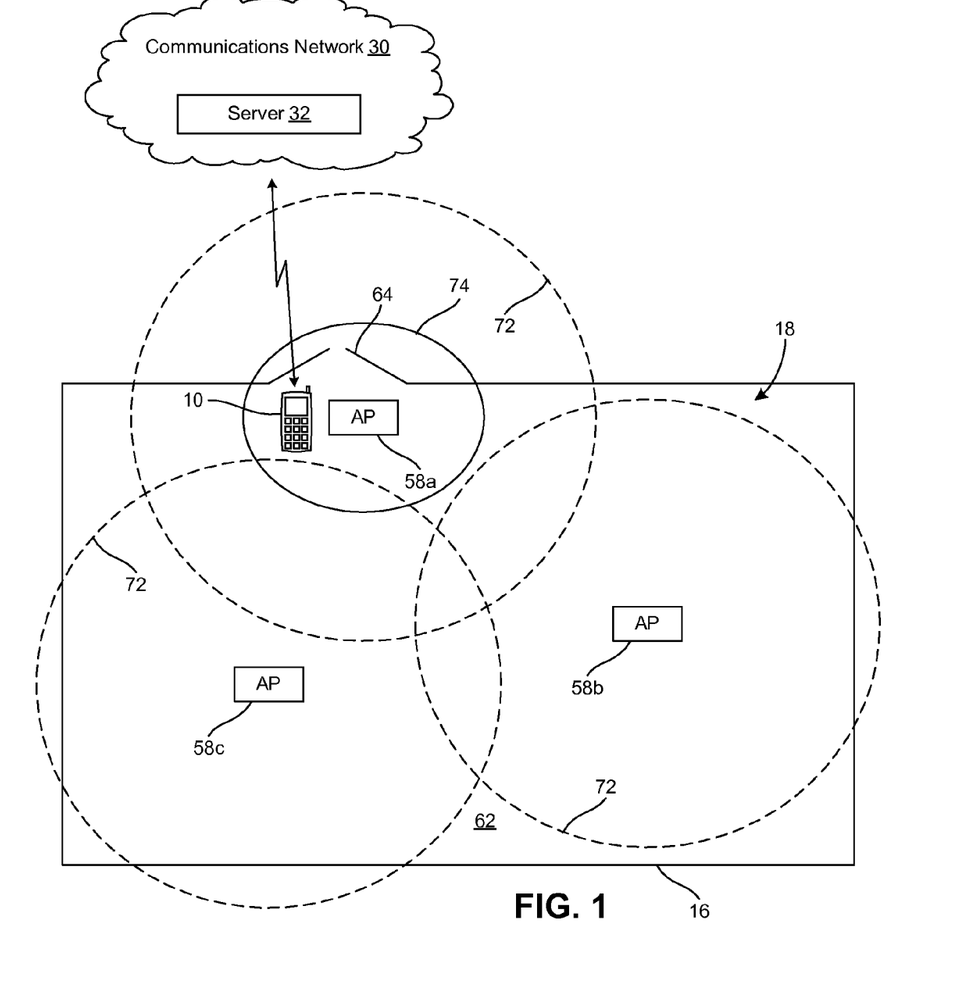
FIG. 1 is a schematic view of an exemplary in-building location assistance system for aiding an electronic device in determining its location while in a corresponding building.
Figure 2:
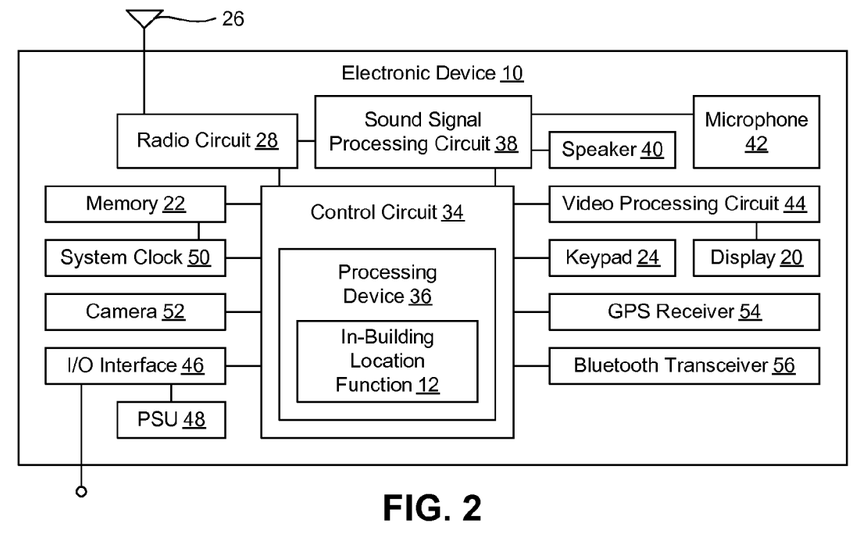
FIG. 2 is a schematic block diagram of the electronic device.

Referring initially to FIGS. 1 and 2, an electronic device 10 in the exemplary form of a mobile telephone is shown. The electronic device 10 includes an in-building location function 12 that is configured to determine a location of the electronic device 10 when the electronic device 10 is in a building 16 that has a coordinating location assistance system 18. Additional details and operation of the in-building location function 12 will be described in greater detail below. The in-building location function 12 may be embodied as executable code that is resident in and executed by the electronic device 10. In one embodiment, the in-building location function 12 may be one or more programs that are stored on a computer or machine readable medium. The in-building location function 12 may be a stand-alone software application or form a part of a software application that carries out additional tasks related to the electronic device 10.

Also, through the following description, exemplary techniques for in-building location determination are described. It will be appreciated that through the description of the exemplary techniques, a description of steps that may be carried out in part by executing software is described. The described steps are the foundation from which a programmer of ordinary skill in the art may write code to implement the described functionality. As such, a computer program listing is omitted for the sake of brevity. However, the described steps may be considered a method that the corresponding device is configured to carry out. Also, while the in-building location function 12 is implemented in software in accordance with an embodiment, such functionality could also be carried out via dedicated hardware or firmware, or some combination of hardware, firmware and/or software.

The electronic device 10 may include a display 20. The display 20 displays information to a user such as operating state, time, telephone numbers, contact information, various menus, etc., that enable the user to utilize the various features of the electronic device 10. The display 20 also may be used to visually display content received by the electronic device 10 and/or retrieved from a memory 22 of the electronic device 10. The display 20 may be used to present images, video and other graphics to the user, such as photographs, mobile television content, Internet pages, and video associated with games.

A keypad 24 provides for a variety of user input operations. For example, the keypad 24 may include alphanumeric keys for allowing entry of alphanumeric information (e.g., telephone numbers, phone lists, contact information, notes, text, etc.), special function keys (e.g., a call send and answer key, multimedia playback control keys, a camera shutter button, etc.), navigation and select keys, a pointing device, and so forth. Keys or key-like functionality also may be embodied as a touch screen associated with the display 20. Also, the display 20 and keypad 24 may be used in conjunction with one another to implement soft key functionality.

The electronic device 10 includes communications circuitry that enables the electronic device 10 to establish communications with another device. Communications may include calls, data transfers, and the like. Calls may take any suitable form such as, but not limited to, voice calls and video calls. The calls may be carried out over a cellular circuit-switched network or may be in the form of a voice over Internet Protocol (VoIP) call that is established over a packet-switched capability of a cellular network or over an alternative packet-switched network (e.g., a network compatible with IEEE 802.11, which is commonly referred to as WiFi, or a network compatible with IEEE 802.16, which is commonly referred to as WiMAX), for example. Data transfers may include, but are not limited to, receiving streaming content (e.g., streaming audio, streaming video, etc.), receiving data feeds (e.g., pushed data, podcasts, really simple syndication (RSS) data feeds), downloading and/or uploading data (e.g., image files, video files, audio files, ring tones, Internet content, etc.), receiving or sending messages (e.g., text messages, instant messages, electronic mail messages, multimedia messages), and so forth. This data may be processed by the electronic device 10, including storing the data in the memory 22, executing applications to allow user interaction with the data, displaying video and/or image content associated with the data, outputting audio sounds associated with the data, and so forth.

In the exemplary embodiment, the communications circuitry may include an antenna 26 coupled to a radio circuit 28. The radio circuit 28 includes a radio frequency transmitter and receiver for transmitting and receiving signals via the antenna 26. The radio circuit 28 may be configured to operate in a mobile communications network 30. Radio circuit 28 types for interaction with the network 30 include, but are not limited to, global system for mobile communications (GSM), code division multiple access (CDMA), wideband CDMA (WCDMA), general packet radio service (GPRS), WiFi, WiMAX, digital video broadcasting-handheld (DVB-H), integrated services digital broadcasting (ISDB), high speed packet access (HSPA), etc., as well as advanced versions of these standards or any other appropriate standard. It will be appreciated that the electronic device 10 may be capable of communicating using more than one standard. Therefore, the antenna 26 and the radio circuit 28 may represent one or more than one radio transceiver.

The communications network 30 may have a server 32 (or servers) for managing calls placed by and destined to the electronic device 10, transmitting data to and receiving data from the electronic device 10 and carrying out any other support functions. The server 32 communicates with the electronic device 10 via a transmission medium. The transmission medium may be any appropriate device or assembly, including, for example, a communications base station (e.g., a cellular service tower, or "cell" tower), a wireless access point, a satellite, etc. The network 30 may support the communications activity of multiple electronic devices 10 and other types of end user devices. As will be appreciated, the server 32 may be configured as a typical computer system used to carry out server functions and may include a processor configured to execute software containing logical instructions that embody the functions of the server 32 and a memory to store such software. In alternative arrangements, the electronic device 10 may wirelessly communicate directly with another electronic device 10 (e.g., another mobile telephone or a computer) and without an intervening network.

The electronic device 10 may include a primary control circuit 34 that is configured to carry out overall control of the functions and operations of the electronic device 10. The control circuit 34 may include a processing device 36, such as a central processing unit (CPU), microcontroller or microprocessor. The processing device 36 executes code stored in a memory (not shown) within the control circuit 34 and/or in a separate memory, such as the memory 22, in order to carry out operation of the electronic device 10. For instance, the processing device 36 may execute code that implements the in-building location function 12. The memory 22 may be, for example, one or more of a buffer, a flash memory, a hard drive, a removable media, a volatile memory, a non-volatile memory, a random access memory (RAM), or other suitable device. In a typical arrangement, the memory 22 may include a non-volatile memory for long term data storage and a volatile memory that functions as system memory for the control circuit 34. The memory 22 may exchange data with the control circuit 34 over a data bus. Accompanying control lines and an address bus between the memory 22 and the control circuit 34 also may be present.

The electronic device 10 further includes a sound signal processing circuit 38 for processing audio signals transmitted by and received from the radio circuit 28. Coupled to the sound processing circuit 38 are a speaker 40 and a microphone 42 that enable a user to listen and speak via the electronic device 10. The radio circuit 28 and sound processing circuit 38 are each coupled to the control circuit 34 so as to carry out overall operation. Audio data may be passed from the control circuit 34 to the sound signal processing circuit 38 for playback to the user. The audio data may include, for example, audio data from an audio file stored by the memory 22 and retrieved by the control circuit 34, or received audio data such as in the form of voice communications or streaming audio data from a mobile radio service. The sound processing circuit 38 may include any appropriate buffers, decoders, amplifiers and so forth.

The display 20 may be coupled to the control circuit 34 by a video processing circuit 44 that converts video data to a video signal used to drive the display 20. The video processing circuit 44 may include any appropriate buffers, decoders, video data processors and so forth. The video data may be generated by the control circuit 34, retrieved from a video file that is stored in the memory 22, derived from an incoming video data stream that is received by the radio circuit 28 or obtained by any other suitable method.

The electronic device 10 may further include one or more input/output (I/O) interface(s) 46. The I/O interface(s) 46 may be in the form of typical mobile telephone I/O interfaces and may include one or more electrical connectors. The I/O interfaces 46 may form one or more data ports for connecting the electronic device 10 to another device (e.g., a computer) or an accessory (e.g., a personal handsfree (PHF) device) via a cable. Further, operating power may be received over the I/O interface(s) 46 and power to charge a battery of a power supply unit (PSU) 48 within the electronic device 10 may be received over the I/O interface(s) 46. The PSU 48 may supply power to operate the electronic device 10 in the absence of an external power source.

The electronic device 10 also may include various other components. For instance, a system clock 50 may clock components such as the control circuit 34 and the memory 22. A camera 52 may be present for taking digital pictures and/or movies. Image and/or video files corresponding to the pictures and/or movies may be stored in the memory 22.

A position data receiver, such as a global positioning system (GPS) receiver 54 or the like, may be involved in determining the location of the electronic device 10. As indicated, the location that is determined using the receiver 54 may be fairly accurate when the electronic device 10 is in outside environments. As will be discussed, location determination may be enhanced using the location assistance system 18 when the electronic device 10 is located in the building 16.

The electronic device 10 may further include a local wireless interface, such as an infrared transceiver and/or an RF transceiver that broadcasts using a short-range radio signal. In the illustrated embodiment, the local wireless interface is a Bluetooth transceiver 56 (sometime referred to as a Bluetooth chipset). The Bluetooth transceiver 56 may be used to establish communication with a nearby device, such as an accessory (e.g., a PHF device), another mobile radio terminal, a computer or another device.

In the illustrated embodiment, the location assistance system 18 includes plural Bluetooth access points (APs) 58 with which the electronic device 10 communicates using the Bluetooth transceiver 56. Although three Bluetooth access points 58 are illustrated, it will be understood that more or less than three Bluetooth access points 58 may be present as part of the location assistance system 18. The number of access points 58 that form part of the location assistance system 18 may depend on the transmitter power of the access points 58, the size of the building 16, and a desired degree of accuracy in the location determinations made by the electronic device 10 when in the building 16. In most instances, as the number of access points 58 increases, the accuracy of the location determinations also may increase.

It will further be appreciated that Bluetooth is one example of a communication standard that uses short-range radio signals to transmit and/or receive data. Therefore, the transceiver 56 and/or the access points 58 may be implemented with other types of short-range wireless devices. In the exemplary embodiment where the devices are Bluetooth enabled devices, the electronic device 10 may communicate with the access points 58 over short distances. For instance, using current Bluetooth technology that broadcasts at approximately 2.4 GHz, the distance between communicating Bluetooth enabled devices may be up to 10 meters in a low power mode or up to 100 meters in a high power mode. Basic Bluetooth technology is well-known among persons skilled in the art and therefore will not be further described herein. Although the exemplary embodiment is described using Bluetooth technology, it is noted that other forms of short-range wireless communications may be used to carry out the disclosed techniques.

Figure 3:
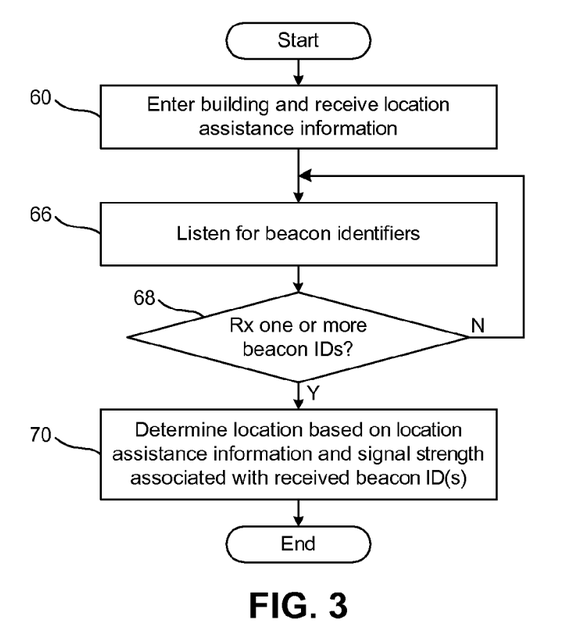
FIG. 3 is a flow chart representing an exemplary method of determining the electronic device's location.

With additional reference to FIG. 3, illustrated are logical operations to implement an exemplary method of determining a location of the electronic device 10 within the building 16. The exemplary method may be carried out by executing an embodiment of the in-building location function 12, for example. Thus, the flow chart of FIG. 3 may be thought of as depicting steps of a method carried out by the electronic device 10. Although FIG. 3 shows a specific order of executing functional logic blocks, the order of executing the blocks may be changed relative to the order shown. Also, two or more blocks shown in succession may be executed concurrently or with partial concurrence. Certain blocks also may be omitted.

The logical flow for the in-building location function 12 may begin in block 60 where the electronic device 10 enters an indoor area 62 of the building 16. Typically, the electronic device 10 will enter the building 16 when carried by a user. The illustrated building 16 is drawn as a simple rectangle and without interior walls or other structures. It will be understood that the building 16 may have any form and may be internally subdivided in any suitable manner. The techniques described herein may be applied to any type of building, including homes, office buildings, schools, warehouses, factories, and so forth.

A first of the Bluetooth access points 58a may be located near an entrance 64 of the building 16. The first access point 58a may establish an interface with the electronic device 10 and provide information to the electronic device 10 for use in determining the relative location of the electronic device 10 when located in the building 16. For instance, also in block 60, the first access point 58a may transmit and the electronic device 10 may receive location assistance information related to the building 16. The location assistance information may then be stored by the electronic device 10, such as in the memory 22. The location assistance information may be stored after the electronic device 10 departs the building 16 for use during future visits to the building 16, or may be deleted upon departure from the building 16. Departure from the building 16 may be detected by using the location determinations that are made by the electronic device 10, for example.

In one embodiment, the location assistance information is a logical map of the building 16 that includes the positions of the access points 58 that are located in the building 16. The map may be of a single floor (e.g., a floor plan) or may be multidimensional to provide information about plural floors. In addition to positions for each access point 58, the map may identify a beacon identity that is broadcast by each access point 58. Each beacon identity may be unique so that the access points 58 may be distinguished from each other.

In addition, the map may contain relative location information so that the electronic device 10 may correlate a position value contained in the location assistance information to a location area that is determined by the electronic device 10. For example, relational data in the map may provide coordinate values (e.g., WGS coordinates) that have a correspondence to various portions of the building. If the electronic device 10 is determined to be in one of the portions of the building, the electronic device 10 may use the correlating coordinate value as the location of the electronic device 10. As another example, the relational data may identify room numbers, room names, etc. In this manner, when the electronic device 10 determines a portion of the indoor area 62 in which the electronic device 10 is located, the electronic device 10 may ascertain and use a corresponding position value for the location of the electronic device 10.

In one embodiment, the first access point 58a use "blip" technology to establish a "blipzone" in which information is broadcast. In particular, the location assistance information may be broadcast using blip technology. The first access point 58a may broadcast the location assistance information in an automatic manner or on-demand. If broadcast automatically, the broadcast may be made continuously (e.g., the entire data set may be broadcast and the broadcast may be repeated as soon as transmission of the entire data set is complete) or may be made periodically (e.g., the entire data set may be broadcast repeatedly in accordance with a predetermined duty cycle). If broadcast on-demand, the electronic device 10 may contact the access point 58a and may download the data set. In one embodiment, the access point 58a may blip broadcast a notice that location assistance data is available for download and, the electronic device 10 may request transmission of the data by the access point 58a upon receipt and recognition of the notice. In another embodiment where the access point 58a broadcasts a beacon identity sequence, the electronic device 10 may be configured to recognize that the sequence is from an access point 58a from which location assistance information is available. Upon such a recognition, the electronic device 10 may undertake action to acquire the location assistance information from the access point 58a.

The first access point 58a may be operatively coupled to a computer (not shown) through a direct connection, through a local area network, or through a wide area network, such as the Internet. The computer may be used to control the first access point 58a, update the location assistance information, or undertake other management responsibilities for the location assistance system 18.

As indicated, the location assistance information informs the electronic device 10 of the positions of the access points 58 with respect to the indoor area 62. The access points 58 may be configured as dummy Bluetooth beacons, each of which broadcasts its associated beacon identity. The beacon identity may be broadcast as a sequence of values (e.g., a sequence of bits) and also may be referred to as an identity sequence. The first access point 58a that transmits the location assistance information also may function as a dummy Bluetooth beacon by broadcasting a beacon identity. The access points 58 also may be referred to as dummy beacons or location beacons. In the illustrated embodiment, a second access point 58b and a third access point 58c function only as location beacons.

The beacon identities may be broadcast repeatedly, such as continuously by broadcasting the entire beacon identity and repeating the broadcast as soon as the broadcast is complete, or periodically by broadcasting the entire beacon identity and repeating the broadcast in accordance with a predetermined duty cycle. In one embodiment, no network infrastructure operatively interconnects the access points 58. Therefore, each access point 58 may operate independently and the access points 58 may not be time synchronized.

In block 66, the electronic device 10 may listen for the sequences broadcast by the access points 58. In one embodiment, the electronic device 10 activates the Bluetooth transceiver 56 on a periodic basis to listen for broadcasts by the access points 58. In a more specific embodiment, the electronic device 10 listens for broadcasts by the access points 58 when the electronic device 10 is being moved in a manner that may correspond to travel through the indoor area 62. For example, the electronic device 10 may include displacement or movement sensors, such as accelerometers, to sense movement of the electronic device 10. This may conserve power over embodiments where the electronic device 10 performs the listening function continuously or periodically on a predetermined schedule, and regardless of movement.

In block 68, a determination may be made as to whether a beacon identity is detected. If a beacon identity is not detected, a negative determination may be made and the logical flow may return to block 66. If a beacon identity is detected, a positive determination may be made and the logical flow may proceed to block 70.

In block 70, the electronic device 10 may make a location determination using available information from the detected broadcast, signal strength values, and/or the location assistance information. In a basic embodiment, when the electronic device 10 detects a broadcast in the form of the beacon identity from one of the access points 58, the electronic device 10 may conclude that the electronic device 10 is within a given distance from the corresponding position of the access point 58. The position of the access point 58 may be known from the location assistance information that was received from the first access point 58a. The distance may be a predetermined distance. For example, a predetermined distance for each access point 58 may be specified in the location assistance information. In one embodiment, transmission characteristics for the access point 58 may be measured or calculated in advance and a corresponding distance value may be made part of the location assistance information. In other embodiments, the electronic device 10 may use a default distance value. The distance may indicate a subset area of the indoor area 62 in which the electronic device 10 is located. For example, the distance may define a circular area around the access point 58 in which the electronic device is located.

If two or more beacon identifiers are detected, a more precise location for the electronic device 10 may be determined. In this case, the electronic device 10 may be within a first distance from one of the access points 58 and a second distance from another of the access points 58. A resulting area in which the electronic device 10 is located may be calculated using basic geometric principles. And, in the case involving distances to two or more known positions of access points 58, the calculated area may be smaller than the area that may be calculated based on just one of the distances. For example, the area in which the electronic device 10 is located may correspond to the intersection of two circular areas around the access points 58 from which beacon identities were received.

In one embodiment, the electronic device 10 detects a signal strength from each access point 58 from which the electronic device 10 detects a broadcast. Received signal strength indicator (RSSI) may be used for this purpose. Using known techniques, such as integration of the RSSI signals, multi-path and shadow fading may be filtered out. Also, based on trend analysis of the RSSI signals, a more accurate positioning estimate for the electronic device 10 may be determined. That is, by analyzing signal strength values in conjunction with known Bluetooth performance characteristics, the probable distance of the electronic device 10 to each access point 58 from which a beacon identity is received is estimated with a relatively high degree of accuracy. Using the distance determinations, the area in which the electronic device 10 is located relative to the indoor area 62 may be determined.

To further improve determination of the area in which the electronic device 10 may be located, the location assistance information that is transmitted by the first access point 58a may include relative field strengths for the signals from the individual dummy beacon access points 58. In one embodiment, the field strengths may be measured in advance and populated into the location assistance information. For instance, the transmission characteristics of each access point 58 may be expressed as signal strength contours that each has an associated signal strength value and an associated distance value that indicates a distance from the corresponding access point 58. The contours (which need not be circular) may be concentrically arranged around the access points 58.

A determined signal strength may be compared against the signal strength thresholds associated with each contour. If the signal strength is greater than the signal strength threshold for a contour, then the electronic device 10 may conclude that it is less than the corresponding distance value away from the access point. Similarly, if the signal strength is less than the signal strength threshold for a contour, then the electronic device 10 may conclude that it is more than the corresponding distance value away from the access point. In this manner, a distance range having an upper distance and a lower distance from the access point may be determined. If the detected signal strength is greater than the signal strength associated with the contour closest to the access point, the lower distance may be zero. Also, if the detected signal strength is less than the signal strength associated with the contour farthest from the access point, the upper distance theoretically may be infinity. However, in this event, a predetermined upper distance corresponding to a known or theoretical maximum transmission distance of the access point 58 may be used. Using the distance ranges, the area in which the electronic device 10 is located relative to the indoor area 62 may be determined.

Effective receive sensitivity of the Bluetooth receiver 56, and therefore the effective transmission range of the access points 58, may be improved by exploiting the fact that the dummy beacon access points 58 repeatedly broadcast their corresponding beacon identities. Consecutive beacon identities, even if received in part, from the same access point 58 may be combined and integrated using, for example, Chase combining. Chase combining is also known as convolution code and is a fundamental form of hybrid automatic repeat-query (HARQ). Maximum performance from Chase combining may occur when the electronic device 10 knows the length of the beacon identity sequence from the location assistance information. Since the electronic device 10 may not know when the beacon identity sequence starts for each repetition (e.g., the repetitions may appear to run together), a known start pattern may be used to aid the electronic device 10 in identifying the start of the sequence or unique sequences may be used in which each rotated sequence maps to the same access point 58. In either case, using Chase combining, the electronic device 10 has the opportunity to integrate bits from many identical sequences and, thereby, detect the coded sequence at a distance that is greater than normal Bluetooth communication would ordinarily allow.

The effective receive distance using Chase combining is shown using dashed lines 72 in FIG. 1. Although not necessarily to scale, solid line 74 represents a normal Bluetooth communication distance where there is not a repeating sequence of bits that may be integrated. Line 74 is shown for comparative reference to line 72.

In one embodiment, the dummy beacon access points 58 may use frequency hopping with the same hopping pattern. This may reduce interference, especially in embodiments where the dummy beacon access points 58 are not time synchronized. To avoid two nearby dummy beacon access points 58 from becoming inadvertently time aligned, an intentional random drift may be applied to the Bluetooth clock in the access points 58 to impart a sliding effect among the dummy beacon access points 58. Alternatively, a random offset may be periodically applied to the frequency hop phase of the dummy beacon access points 58.

Thus far, determining in-building location has been described using Bluetooth radio devices. At present, a Bluetooth approach is regarded as being a convenient platform since many mobile devices are Bluetooth compatible and Bluetooth transceivers 56 consume relatively little power. However, the disclosed techniques may be applied to other present or future wireless radio platforms. One example of an alternative platform is WiFi. In another embodiment, a combination of platforms may be used. For instance, the access point from which the electronic device 10 receives the location assistance information may operate in accordance with Bluetooth and the remaining location beacons may be implemented with WiFi access points. The Bluetooth access point may serve as a beacon that informs the electronic device 10 that it is in the presence of the assistance system 18 and, in response, the electronic device 10 may turn on a WiFi transceiver for WiFi beacon scanning for determining position of the electronic device 10 relative to the indoor area 62. This approach may be convenient where a WiFi network is already deployed in the building 16.

In yet another embodiment, the first access point 58a may be used to provide bidirectional communications to the electronic device 10 for transferring the location assistance information. In this embodiment, a radio system such as a Bluetooth radio or a WiFi radio may be used for the first access point 58a. For the remaining dummy beacons (e.g., access points 58b and 58c in the illustration of FIG. 1), a one-directional communication link may be used since a corresponding receiver in the electronic device 10 may consume a relatively low amount of power. Therefore, frequent or continuous scanning for signals from the dummy beacons may be made. An exemplary one-directional communication link for this purpose may be the currently emerging Bluetooth Low Energy (LE) standard, which operates in the 2.4 GHz band. Alternatively, other standardized or proprietary radio protocols may be used to minimize power consumption in the electronic device 10. For example, an exemplary low-power and low-data rate broadcast link may be an FM broadcast, such as an FM broadcast using radio data system (RDS) channels to carry the beacon data. Another example is a communication link that applies an on-off-keying (OOK) technique at low duty cycles and that operates in an automation band, such as short range devices (SRD) band ranging from 863 MHz to 870 MHz as is found in Europe or industrial, scientific and medical (ISM) band ranging from 902 MHz to 928 MHz as is found in the United States.

As the electronic device 10 moves through the building, the electronic device 10 may discover information that may be useful in making a location determination but is not contained in the location assistance information. For example, the electronic device 10 may interface with a WiFi device with an service set identifier (SSID) that was not previously known. This device may be considered a new beacon and the electronic device 10 may collect proximity information, such as signal strength values associated with the "discovered" beacon. In addition, proximity information, such as signal strength information, for beacons that are known from the location assistance information may be collected. Other collected information may be data from an altimeter to identify an elevational relationship of the electronic device 10 with the beacons, particularly in a multilevel building. The collected information may be packaged into a data set and provided back to the location assistance system 18 for enhancement of the location assistance information. In one embodiment, the collected information may be transferred to the first access point 58a when the electronic device 10 departs the building 16. Other data delivery techniques include, for example, delivery over a cellular or packet-switched network to a data collection server. The data collection server may be hosted by an entity that processes the information for widespread use, such as for Internet-based applications, location determination by mobile telephone service providers, and so forth. By transmitting the collected information back to the system 18 or some other system that uses the collected information, the collected information may assist in making future location determinations for the electronic device 10 and/or assist in making location determinations for other electronic devices.

The electronic device 10 may use in-building location information in any suitable manner. For instance, the information may be shared with other electronic devices so that users of the other electronic devices may locate the user of the electronic device 10. In another embodiment, the electronic device 10 may carry out a predetermined command. For instance, if the electronic device 10 determines that it is in a meeting room, the electronic device 10 may turn off an audible ringer. In another embodiment, if the electronic device 10 senses that it has left the user's normal workspace, the electronic device 10 may command a telephone system to forward calls normally received with a hardwired phone in the user's normal workspace to the electronic device 10.

Although certain embodiments have been shown and described, it is understood that equivalents and modifications falling within the scope of the appended claims will occur to others who are skilled in the art upon the reading and understanding of this specification.

What is claimed is:

1. A method of determining a location of an electronic device when the electronic device is in a building, comprising:
   receiving location assistance information from a data source when the electronic device enters the building, wherein the location assistance information is a logistical map containing a position and a beacon identity for each of plural location beacons that are deployed in the building;
   listening for one or more beacon identities from the location beacons;
   collecting data in addition to the location assistance information as the electronic device moves within the building;
   determining an area of the building in which the electronic device is located, the area determined from a distance parameter associated with each received beacon identity and from the collected data, each distance parameter indicating a relative distance between the electronic device and the position of the corresponding location beacon contained in the location assistance information; and
   transmitting the collected data from the electronic device to a location assistance system when the electronic device departs the building, the transmitted collected data for updating the location assistance information for making future location determinations for the electronic device or another electronic device.

2. The method of claim 1, wherein the location assistance information is received from a wireless access point when the electronic device enters the building.

3. The method of claim 2, wherein the wireless access point also functions as one of the location beacons.

4. The method of claim 1, wherein the data source broadcasts the location assistance information using Bluetooth.

5. The method of claim 1, wherein the location beacons broadcast using a one-directional broadcast protocol.

6. The method of claim 1, wherein the location beacons are not interconnected with a network infrastructure.

7. The method of claim 1, further comprising correlating the determined area to a position value using the location assistance information, the position value approximating the location of the electronic device.

8. The method of claim 1, further comprising determining a signal strength for each received beacon identity, and using the signal strengths to determine the distance parameter.

9. The method of claim 8, wherein the location assistance information contains signal strength contours for each location beacon, and the signal strengths for each received beacon identity are compared to the corresponding signal strength contours to determine a distance range between the electronic device and the corresponding location beacon.

10. The method of claim 1, wherein the electronic device uses Chase combining to extend a listening range of the electronic device for the beacon identities.

11. The method of claim 1, further including carrying out at least one of turning off an audible ringer of the electronic device or commanding a telephone system to forward calls normally received with a hardwired telephone to the electronic device in response to the determination.

12. The method of claim 1, further comprising:
   receiving updated location assistance information from the data source when the electronic device returns to the building, wherein the updated location assistance information is a logistical map containing a position and a beacon identity for each of the plural location beacons that are deployed in the building.

13. An electronic device, comprising:
   a radio circuit over which location assistance information from a data source is received when the electronic device enters the building, wherein the location assistance information is a logistical map containing a position and a beacon identity for each of plural location beacons that are deployed in a building; and
   a control circuit that controls the electronic device to:
      listen for one or more beacon identities from the location beacons;
      collect data in addition to the location assistance information as the electronic device moves within the building;
      determine an area of the building in which the electronic device is located, the area determined from a distance parameter associated with each received beacon identity and from the collected data, each distance parameter indicating a relative distance between the electronic device and the position of the corresponding location beacon contained in the location assistance information; and
      transmit the collected data from the electronic device to a location assistance system when the electronic device departs the building, the collected data for updating the location assistance information for making future location determinations for the electronic device or another electronic device.

14. The device of claim 13, wherein the control circuit controls the electronic device to carry out at least one of turning off an audible ringer of the electronic device or commanding a telephone system to forward calls normally received with a hardwired telephone to the electronic device in response to the determination.

15. A location assistance system for aiding an electronic device to determine a location of the electronic device while in a building in which the location assistance system is deployed, comprising:
   a plurality of location beacons that each broadcast a beacon identity; and
   a wireless access point that transmits location assistance information when the electronic device enters the building, wherein the location assistance information is a logistical map containing a position and the beacon identity for each of the plural location beacons,
   wherein the location assistance system is configured to:
      receive data collected by the electronic device when the electronic device departs the building; and
      update the location assistance information using the collected data, the updated location assistance information for making future location determinations for the electronic device or another electronic device.

16. The system of claim 15, wherein the wireless access point is located at an entrance to the building to broadcast the location assistance information to the electronic device when the electronic device enters the building.

17. The system of claim 15, wherein the wireless access point also functions as one of the location beacons.

18. The system of claim 15, wherein the location beacons broadcast using a one-directional broadcast protocol.

19. The system of claim 15, wherein the location assistance information contains signal strength contours for each location beacon.

20. The system of claim 15, wherein the beacon identities are broadcast by each location beacon as a repeating sequence.

* * * * *